United States Patent [19]
Peyrot

[11] 3,719,791
[45] March 6, 1973

[54] MOBILE FLUID-TIGHT SEALING DEVICE

[76] Inventor: Jean-Pierre Peyrot, Domaine du Bel-Abord, Chilly-Mazarin, France

[22] Filed: Sept. 16, 1970

[21] Appl. No.: 72,647

[30] Foreign Application Priority Data

Oct. 6, 1969 France..............................6934060

[52] U.S. Cl............................................219/121 EB
[51] Int. Cl. ..............................................B23k 15/00
[58] Field of Search ............219/121 ER, 121 EA, 72

[56] References Cited

UNITED STATES PATENTS 3,136,883   6/1964   Radtke..........................219/121 EB
3,485,998   12/1969  Gerard................................219/121
3,483,351   12/1969  Wood...........................219/121 EB
3,435,185   3/1969   Gerard................................219/121
3,136,882   6/1964   Radtke.......................219/121 ER X Primary Examiner—J. V. Truhe
Assistant Examiner—Gale R. Peterson
Attorney—Karl W. Flocks

[57] ABSTRACT

Fluid tight access device for a welding tool comprising a mobile vacuum chamber, a fixed chamber, a tape, the two edges of said tape being applied on each side of the access of the fixed chamber, conical rollers allowing to displace the mobile chamber as regards to the fixed chamber during the operation of welding without modifying the vacuum of the mobile chamber, the way of the tape being displaced offset the working plane of the tool.

6 Claims, 16 Drawing Figures

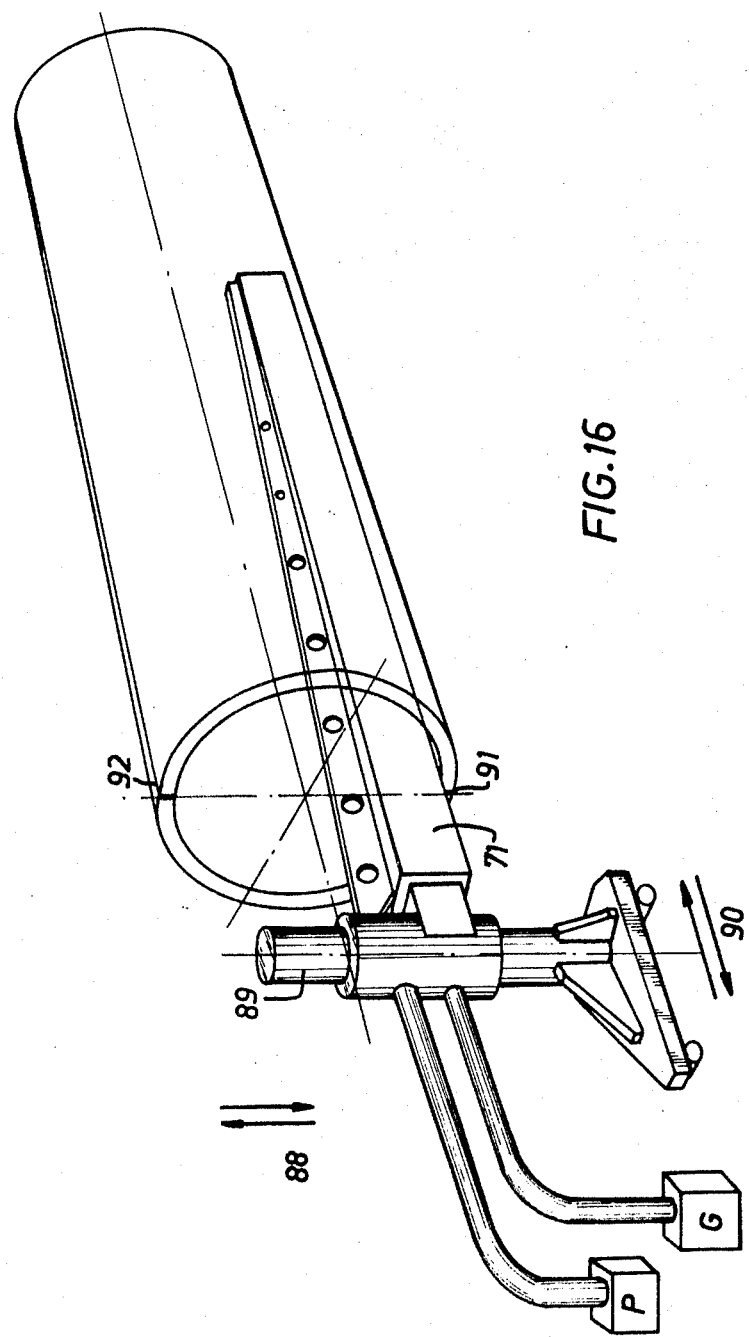

MOBILE FLUID-TIGHT SEALING DEVICE

The present invention relates to a mobile fluid-tight device, and especially to a device permitting the movement of objects, tools or electronic welding beams inside fluid-tight chambers.

It is already known to provide a vacuum bell containing an electron gun which can be moved in a fluid-tight manner along a welding joint, fluid-tightness along the welding joint being ensured by a thin metal tape pierced by the beam at the place where the metal sheets are melted and the welding is effected.

The invention has mainly for its object to provide an apparatus which enables two metal sheets to be welded on each side of a welding joint closed by a tape, without perforating the tape.

The invention has also for its object:

A method permitting the displacement of a tool inside a working chamber, in which fluid-tightness is ensured along a predetermined line of one wall of this chamber by means of a fixed joint which moves at the place where the tool passes into the working chamber;

A fixed joint covering a line of displacement determined for the path of a mobile fluid-tight chamber which is associated therewith and which can slide in a fluid-tight manner above the joint, a device for diverting the joint and replacing it in position being provided in the interior of the mobile chamber;

A diversion system for a joint placed in the working plane of a tool along a path of penetration, the diversion taking place obliquely outside this plane;

A mobile chamber comprising a diversion system for a fluid-tight joint located between the mobile chamber and a working chamber;

A device for working under vacuum capable of being moved along a predetermined path on a working chamber by effecting during its passage the diversion of a fluid-tight joint provided between a working chamber and the atmosphere;

A fixed chamber of two parts, with a mechanism permitting the displacement of the mobile chamber together with a rolling track placed under pressure between the two parts.

Other characteristic features and advantages will be brought out in the description which follows below, given with reference to the accompanying drawings, and showing by way of indication but not in any limitative sense a number of forms of embodiment of the invention.

In these drawings:

FIG. 16 is a view of an alternative form permitting the linear welding of barrel-plates of large dimensions. This arrangement utilizes the girder of FIG. 12 slidably mounted on a vertical column movable on the ground and rigidly fixed to its generator and its pumping set.

Figure 1:
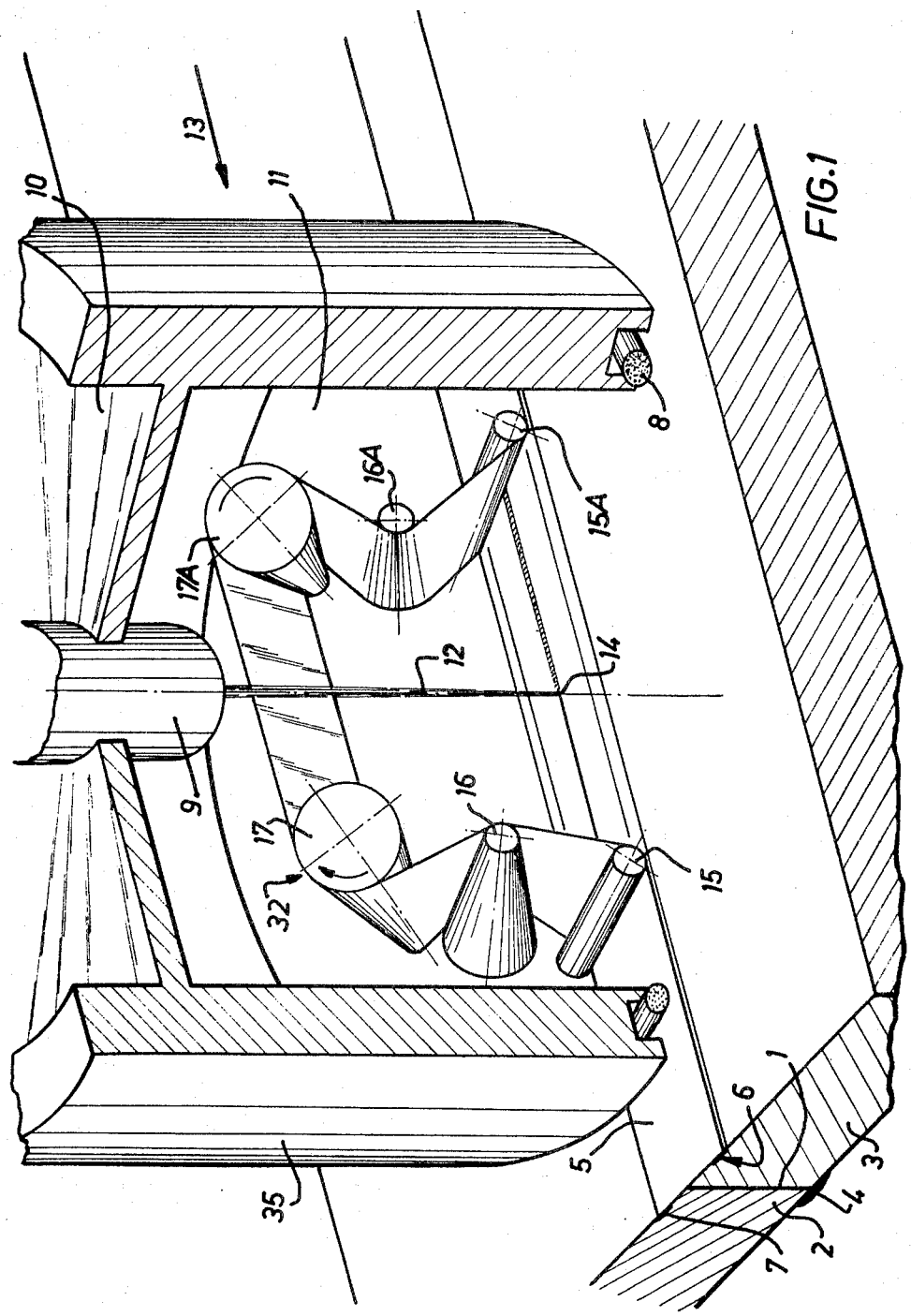
FIG. 1 is a view of a mobile chamber and a diversion device for the joint according to the invention, inside the mobile chamber.

There can be seen from FIG. 1 a joint to be welded by bringing together two metal plates 2 and 3. Vacuum-tightness at 4 and at the front and the rear of the joint to be welded is effected in known manner. A thin tape 5 of steel or other material is placed over the upper part of the sheets 2 and 3, covering the joint 1, and its fluid-tightness is ensured along the edges 6 and 7.

It is known that it is possible to displace a vacuum bell 35 containing an electron gun 9 in a fluid-tight manner at 8.

This bell 35 has two compartments, of which one, 10, is put under secondary vacuum and contains the filament of the gun, while the other, 11, is put under a primary vacuum.

In the prior art, in order to carry out the welding of the joint 1, the beam of electrons 12 emitted by the gun pierces a fixed tape applied against the joint and melts the plates through this tape.

The invention provides an apparatus which permits the two plates 2 and 3 to be welded directly without perforating the tape 5. To do this, inside the chamber 11, a detachment system for the tape referred to as a whole by 32, permits the bell to slide in the direction of the arrow 13, deflecting the tape from the trajectory of the beam of electrons 12, which permits the joint 1 of the plates 2 and 3 to be directly bombarded at 13. The lifting away of the sealing tape 5 in the chamber 11 also enables a primary vacuum to be maintained in a constant manner in the joint 1 before its welding, together with the space comprised between the upper faces of the plates 2 and 3 and the tape 5, which is a considerable advantage of the method and provides a substantial technical advance.

The system 32 for diverting the tape comprises a plurality of rollers rotating freely on fixed shafts fast with the chamber 11.

Cylindrical rollers 15 and 15a enable the tape to be applied against the plates 2 and 3 up to the point inside the chamber 11. They also constitute the limiting points of detachment of the tape.

The conical rollers 16, 16a, 17 and 17a, are made by means of conical washers of moderate thickness, which can each rotate at different speeds on the shaft so as to prevent any slip of the tape on the rollers.

Due to their conical shape and the positions of their shafts, these rollers enable the tape to be diverted in order to disengage the trajectory of the electron beam.

Figure 2:
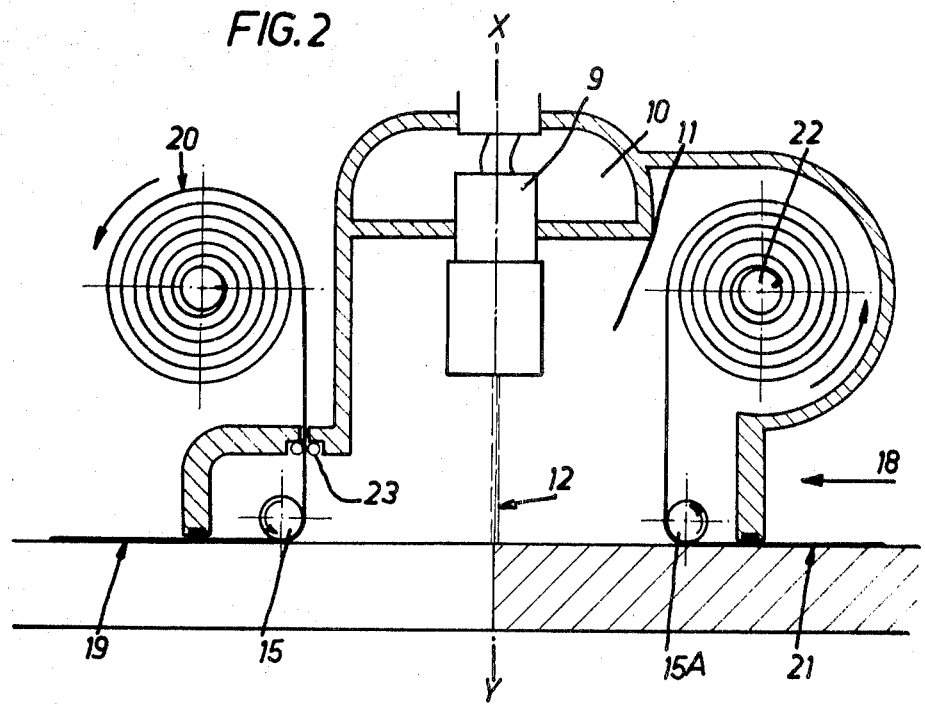
FIG. 2 is a view of an alternative form, in which the diversion of the static joint is replaced by the winding of two static joints.

There can be seen from FIG. 2 a chamber with two compartments 10 and 11 containing its electron gun 9 and its beam of electrons 12. The vacuum bell is displaced for welding in the direction of the arrow 18. In this alternative form, there is no deviation of the tape in order to disengage the electron beam, but at the winding point the tape 19 is wound on a winder 20 and at the unwinding point a tape 21 is unwound from the unwinding device 22. The pressure-application rollers 15 and 15a are retained as in the case of FIG. 1. The winding and unwinding devices may be mounted inside the chamber 11 (following the mounting on the right-hand side of the axis XY) or on the outside (following the mounting of the left-hand side of the axis XY). In this latter case, fluid-tight sealing at 23 is effected at the outlet position of the tape.

Figure 3:
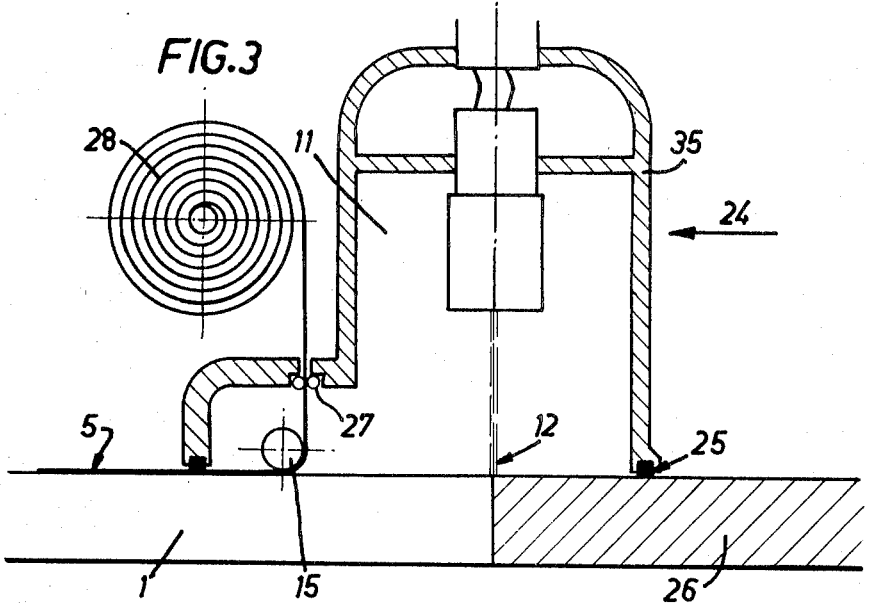
FIG. 3 is a view of an alternative form with a single winding of the joints.

There is shown in FIG. 3 a vacuum bell 35 which is moved for welding in the direction of the arrow 24. In this alternative form, the tape 5 only effects the fluid-tightness of the joint 1 before welding, fluid-tightness at 25 being effected on a welded portion since the electron beam 12 has melted all the shaded portion 26. The tape 5 is pressed in position up to the chamber 11 by the pressure roller 15; it passes out of the chamber 11 in a fluid-tight manner 27 and is wound on the tensioning winder 28, the shaft of which is fixed on the exterior of the vacuum bell or inside this latter in the same manner as the alternative form shown on the right-hand side of the axis XY of FIG. 2.

Figure 4:
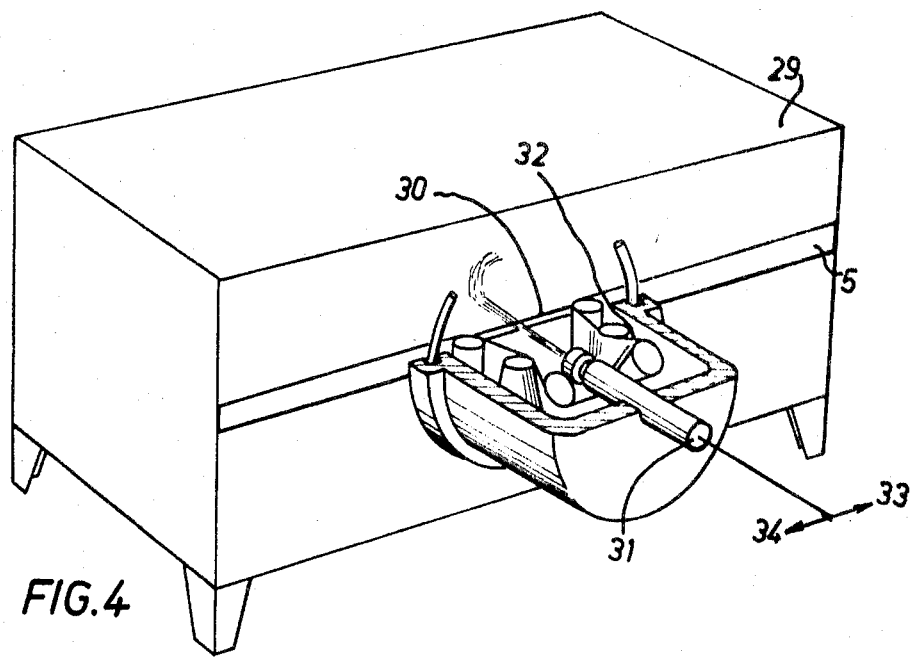
FIG. 4 is a view of the application of the invention to handling devices inside fluid-tight glove boxes.

There is shown in FIG. 4 a chamber 29 of a glove box, inside which exists a vacuum or a depression with respect to the exterior. Through an opening 30, a tool 31 passes into the chamber so as to carry out a predetermined operation, for example handling, examination, welding, machining. The sliding fluid-tightness of the bell is ensured as shown in FIG. 1 and the sealing tape 5 is diverted by the system 32 or a system similar to that of FIG. 2.

The bell can be displaced linearly and alternately in the direction of the arrows 33 and 34, uncovering the opening 30, which permits the operation of the tool 31 inside the chamber.

Figure 5:
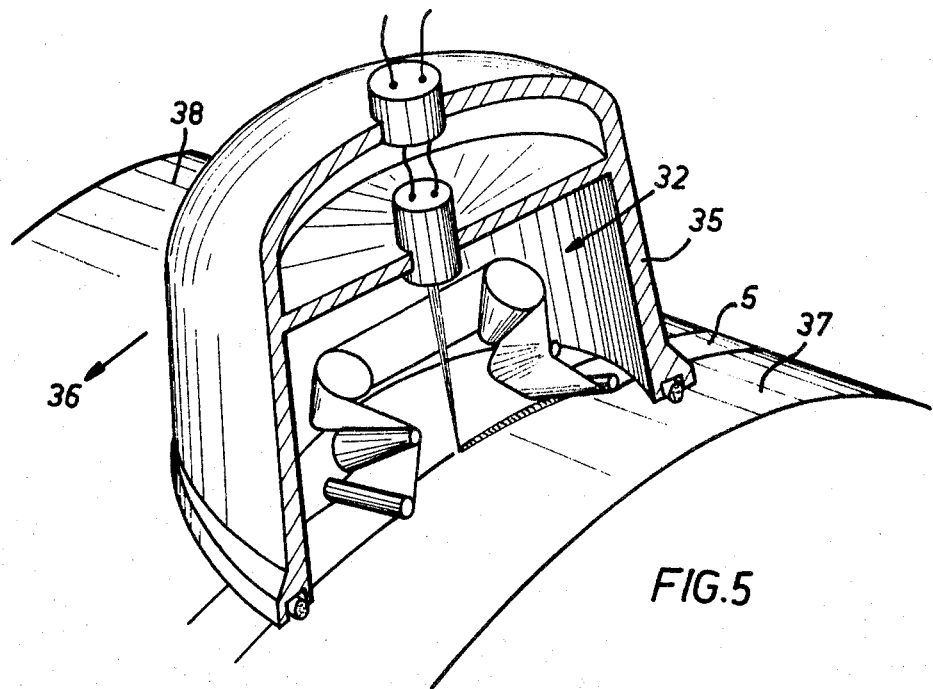
FIG. 5 is a view of an apparatus according to the invention applied to the butt-welding of barrel-plates by electronic bombardment.

There is shown in FIG. 5 a bell 35 similar to that of FIG. 1, effecting the junction by welding under electronic bombardment in the direction of the arrow 36, of two metal cylinders 37 and 38. The diversion system 32 for the tape 5 may of course be replaced by that of FIGS. 2 or 3.

Figure 6:
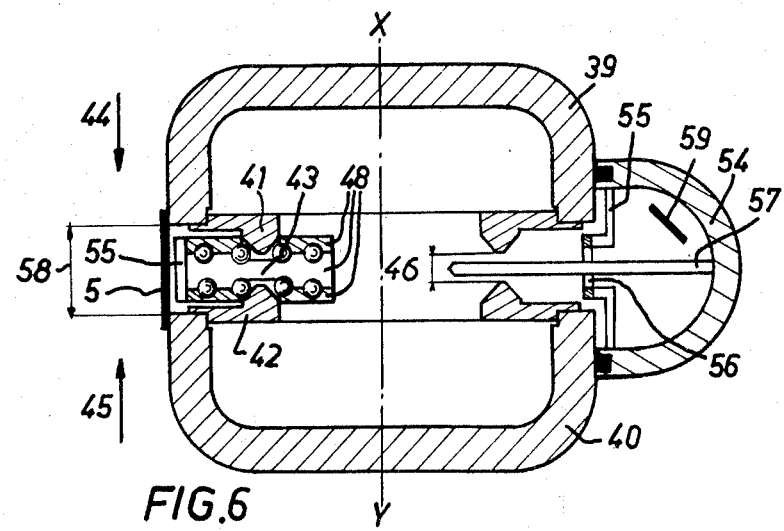
FIG. 6 is a view in cross-section of a vacuum chamber in two parts taken along the line VI—VI of FIG. 7.
Figure 7:
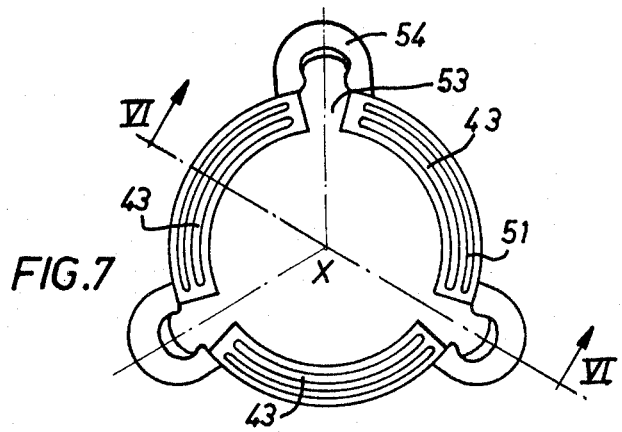
FIG. 7 is a plan view of the device with three mobile chambers, permitting operations to be effected inside the circular vacuum chamber of FIG. 6.

There are shown in FIG. 6 two cylindrical fixed half-chambers 39 and 40. At the base of each of these elements a ring 41 and 42 is centered and supported. These two rings 41 and 42 are supporting rings on which the rolling segment 43 can be displaced with a double-acting abutment. The chamber, the supporting rings and the rolling segment are held pressed against each other in the direction of the arrows 44 and 45 by the forces due to atmospheric pressure owing to the depression existing inside the chambers 39 and 40. Fluid-tightness of the joint between the two elements 39 and 40 is ensured by the tape 5.

Figure 8:
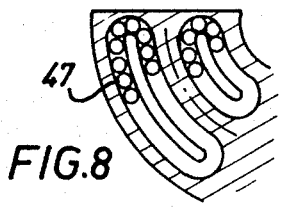
FIG. 8 is a view of a detail.

This assembly makes it possible to maintain a constant distance apart at 46 between two rolling tracks 43 of the rings 41 and 42. The bearing 43 can thus carry out a circular movement about the axis XY between the rings 41 and 42. The balls 48 (see FIG. 8) circulate continuously in the bean-shaped tracks 47.

Figure 9:
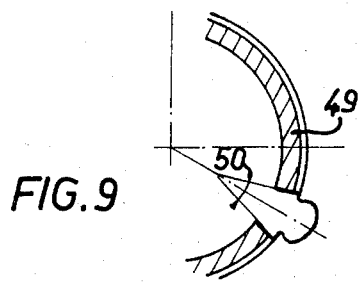
FIG. 9 is a diagrammatic view of an alternative form of construction.

The rolling track can be interrupted as at 49 (see FIG. 9) by an angular amount 50, or it may only have the value of a segment 51. A number of segments 43 are engaged between the rings 41 and 42, for example three, and leave spaces 53 between them. Opposite these spaces are located mobile chambers 54 similar to the chamber 35, which are rigidly fixed to the rolling segments, a rigid ring 55 coupling the three chambers 54 to the bearings 43. The ring 55 is provided with an opening 56 which permits under each bell the penetration of a tool into the chambers 39 and 40 through the space 46. Fluid-tightness is ensured by a tape 5 as in FIG. 1, on the space 58 comprised between the chambers 39 and 40. The deflection of the tape at 59 in each bell enables the tool to pass into the chambers 39 and 40 and is effected by the systems of diverting rollers of FIGS. 1 and 2.

The chamber or chambers 54 thus slide in an orbital manner between the two cylindrical chambers 39 and 40 and permit operations to be carried out in a fluid-tight manner inside these chambers.

Figure 11:
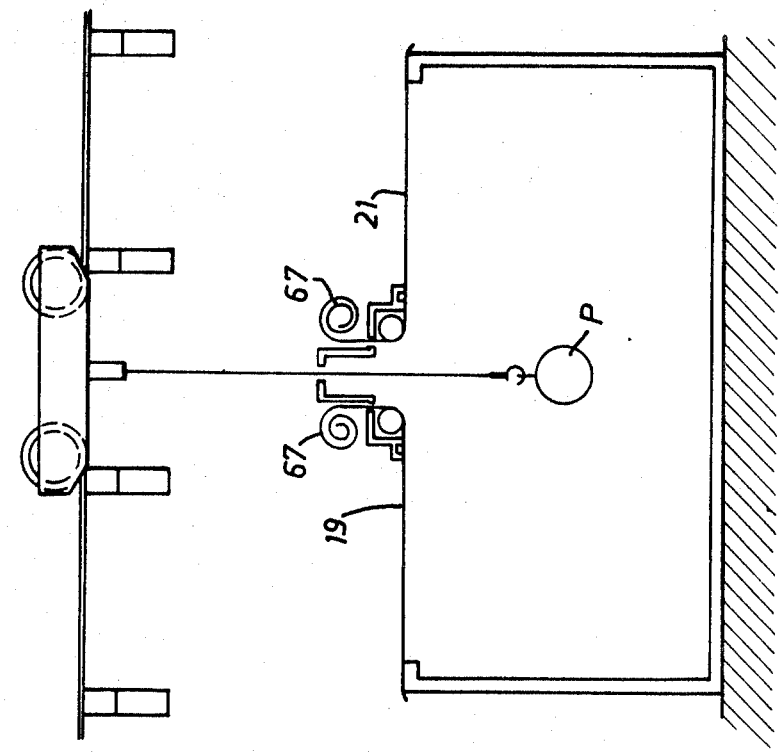
FIG. 11 is a view taken along the line XI—XI of FIG. 10.
Figure 10:
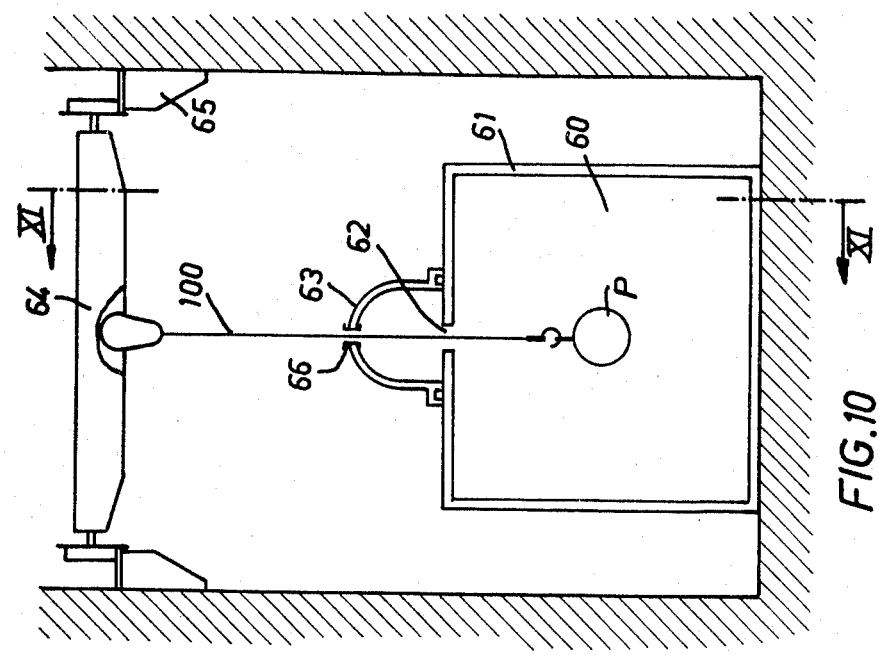
FIG. 10 is a view of an apparatus according to the invention employed for handling heavy loads inside a fluid-tight laboratory.

In FIGS. 10 and 11 there is shown an application of this fluid-tightness device to the handling of heavy parts inside the interior 60 of a chamber 61 containing corrosive, contaminated or irradiated products (a laboratory of high activity for example). The chamber 61 comprises an opening 62 at its upper portion, this opening being covered by the joints 19 and 21, diverted according to the invention, and the mobile chamber 63. A crane 64 outside the chamber 61 and rolling on rails 65, carries the load P by means of a cable 100 which passes in a fluid-tight manner at 66 through the mobile chamber 63. There are shown in cross-section in FIG. 11 the joints 19 and 21 wound on the drums 67, similar to the drums 22 of FIG. 2.

Figure 12:
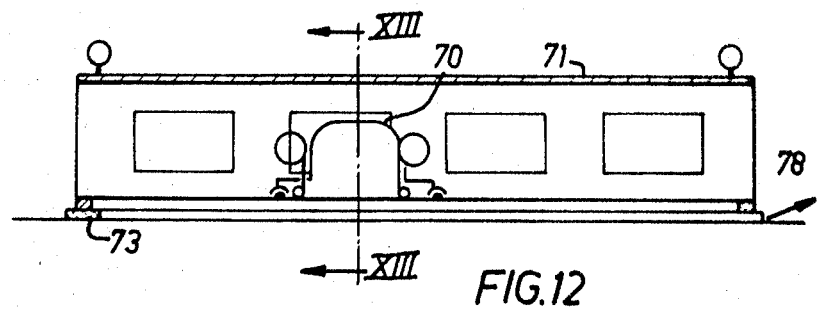
FIG. 12 is a view of a girder member for linear welding by electronic bombardment.
Figure 13:
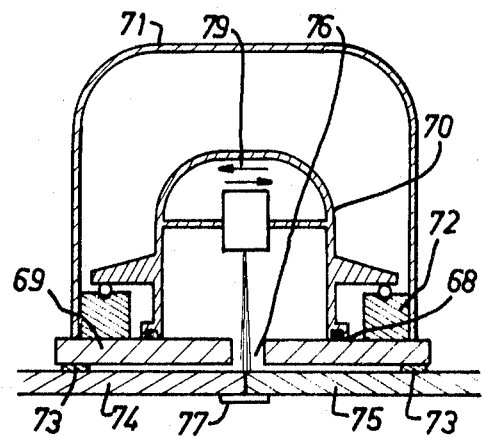
FIG. 13 is a view to a larger scale, taken along the line XIII—XIII of FIG. 12.

In FIGS. 12 and 13 there is shown the application of the method, according to the alternative form of FIG. 2, to two plates 74 and 75 to be welded by electronic bombardment, the external surfaces of which are too irregular to permit sufficient fluid-tightness to be obtained with the tape.

In this case of application, the tape is pressed against machined sole-plates 68 and 69 on which slides the mobile chamber. The machined plates 68 and 69 are rigid and fixed to a rigid girder 71, the section of which forms a tunnel in which the mobile chamber is displaced. The inside of this tunnel is left at atmospheric pressure. The said mobile chamber rolls on the rails 72 of the girder which withstands the forces due to the suction of the chamber caused by the vacuum. Fluid-tightness between the lower face of the sole-plates 68 and 69 and the upper faces of the sheets 74 and 75 to be welded is effected at 73 by a plastic putty or any other product which enables the surface imperfections of sheets to be corrected.

The girder 71 and its mobile chamber 70 being placed in a fluid-tight manner at 73 on the sheets 74 and 75 to be welded, the welding can be effected by electronic bombardment through the straight-line opening 76 located above the joint to be welded 77 and parallel thereto.

A defect of parallelism of the joint 77 to be welded and the path of the mobile chamber, which may exist at the time of placing the girder 71 in position is corrected by a joint-follower system (now shown) which moves the gun inside the mobile chamber perpendicularly to the joint to be welded, in the direction of the arrows 79.

When so required, and in order to maintain a good primary vacuum in the space comprising the joint 77 to be welded and the space comprised between the upper faces of the sheets 74 and 75 and the lower face of the sole-plates 68 and 69, a primary pump can be connected to the end of the girder so as to carry out pumping in the direction of the arrow 78 during the whole period of the welding operation.

This pumping is additional to that effected by the primary pump for the mobile chamber 70.

Figure 14:
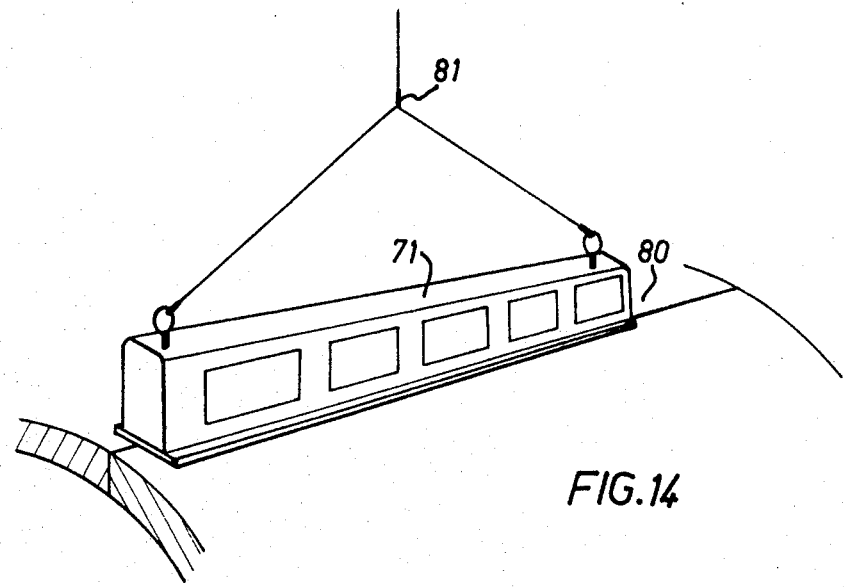
FIG. 14 is a perspective view of the girder of FIG. 12 placed by means of a pulley-block on a joint to be welded between two barrel plates of large diameter.

There is shown in FIG. 14 the girder 71 with its mobile chamber 70 which, in view of its great length, may be deposited on sheets or barrel-plates 80 to be welded longitudinally, by means of a lifting hook 81 of a travelling or other crane.

Figure 15:
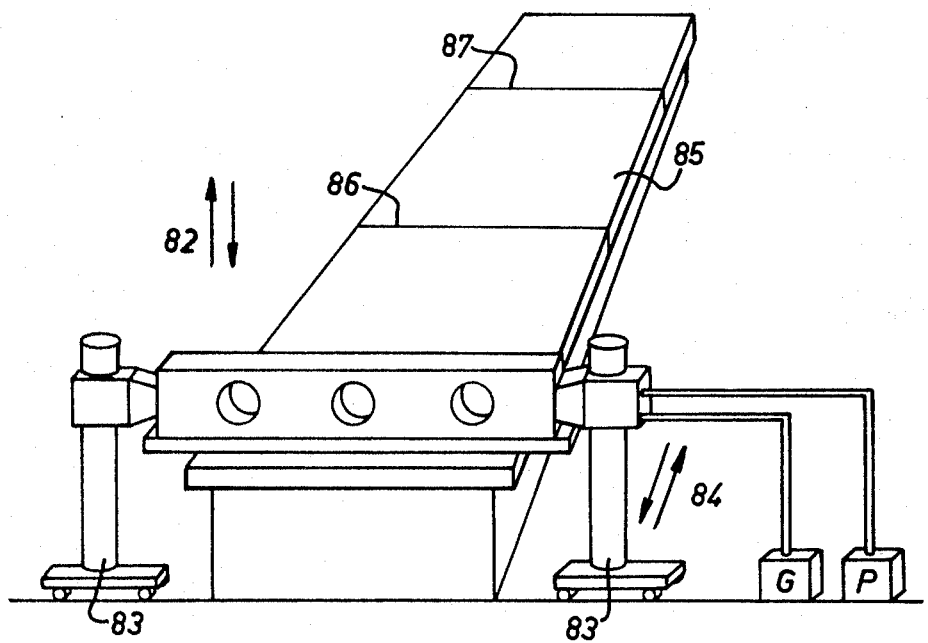
FIG. 15 is a view of the utilization of the girder of FIG. 12 for butt-welding metal plates of large size on a bench with rising columns.

There is shown in FIG. 15 an alternative form of the device of FIG. 13, mounted to slide in the direction of the arrows 82 on two pillars or columns 83. These columns may also be moved in the direction of the arrows 84, which permits for example the butt-welding of the plates 85 by carrying out the welds 86 and 87 and following transversely.

There is shown in FIG. 16 a further alternative method of placing in position the girder 71 slidably mounted in the direction of the arrows 88 on a column 89, which may in turn be moved in the direction of the arrows 90. This application permits for example the welding of the joint 91 from the interior or of the joint 92 from the exterior, of a barrel-plate of very large size.

It will of course be understood that the present invention has been described by way of indication as a preferred example, but not in any limitative sense, and that any equivalents may be introduced into its constituent elements without thereby departing from its scope as defined by the appended claims.

I claim:

1. A movable sealing device for an electron beam welding device comprising
   a fixed chamber,
   a mobile vacuum chamber positioned to cover a portion of said fixed chamber,
   a tape having its edges applied in a fluid-tight manner on each side of a line of opening of said fixed chamber,
   cylindrical and conical rollers in contact with said tape,
   a first extremity of said tape penetrating into said mobile chamber passing under a first said cylindrical roller about which the general direction of the tape is desired and moves away from said line of opening so as to uncover a working passage at its level,
   said tape then passing round a first said conical roller which displaces said tape obliquely with respect to the normal plane of access to said working passage,
   said tape then passing round a second said conical roller which sends the tape in a general direction parallel to said line of opening but following an oblique plane with reference to the plane of said tape when it is located outside said mobile chamber and in a position displaced to one side with respect to a plane normal to this latter at the level of the line of opening,
   two further said conical rollers and a further said cylindrical roller symmetrically disposed with respect to said first-mentioned three rollers,
   said latter conical rollers and cylindrical roller permitting a second extremity of said tape passing out of said mobile chamber to be applied against the opposite side of the line of opening with respect to the center of said mobile chamber so as again to close in a fluid-tight manner the line of opening of the other side of the passage uncovered for the welding.

2. The movable device of claim 1, further characterized by
   said mobile vacuum chamber being a bell which is fitted to be displaced along a curvilinear welding joint between two cylindrical barrel plates to be welded.

3. A sealing device for plates to be welded comprising
   a gantry girder adjacent the plates to be welded,
   sole plates fixed on said gantry girder,
   said gantry girder resting on said sole plates with said sole plates in fluid-tight contact with the plates to be welded,
   moldable means forming the fluid-tight contact between said sole plates and the plates to be welded,
   travelling rails positioned within said gantry girder,
   a mobile vacuum chamber movable within said gantry girder on said rails,
   a fixed chamber positioned to be partially covered by said mobile chamber,
   a tape having its edges applied in a fluid-tight manner on each side of a line of opening of said fixed chamber,
   cylindrical and conical rollers in contact with said tape,
   a first extremity of said type penetrating into said mobile chamber passing under a first said cylindrical roller about which the general direction of the tape is desired and moves away from said line of opening so as to uncover a working passage at its level,
   said tape then passing round a first said conical roller which displaces said tape obliquely with respect to the normal plane of access to said working passage,
   said tape then passing round a second said conical roller which sends the tape in a general direction parallel to said line of opening but following an oblique plane with reference to the plane of said tape when it is located outside said mobile chamber and in a position displaced to one side with respect to a plane normal to this latter at the level of the line of opening, two further said conical rollers and a further said cylindrical roller symmetrically disposed with respect to said first-mentioned three rollers, said latter conical rollers and cylindrical roller permitting a second extremity of said tape passing out of said mobile chamber to be applied against the opposite side of the line of opening with respect to the center of said mobile chamber so as again to close in a fluid-tight manner the line of opening of the other side of the passage uncovered for the welding.

4. The sealing device of claim 3, further characterized by means to move said girder in at least one direction transverse to its length.

5. A sealing device for plates to be welded with an electron gun comprising a mobile vacuum chamber carrying the electron gun, carriage means for supporting said mobile chamber for travel over the plates to be welded, fluid-tight means connecting said mobile chamber to the plates to be welded cooperating with said carriage means to form a fluid-tight connection between said mobile chamber and plates to be welded, a fixed chamber positioned to be partially covered by said mobile chamber during its travel over the plates to be welded, a tape having its edges applied in a fluid-tight manner on each side of a line of opening of said fixed chamber, cylindrical and conical rollers in contact with said tape, a first extremity of said tape penetrating into said mobile chamber passing under a first said cylindrical roller about which the general direction of the tape is desired and moves away from said line of opening so as to uncover a working passage at its level, said tape then passing round a first said conical roller which displaces said tape obliquely with respect to the normal plane of access to said working passage, said tape then passing round a second said conical roller which sends the tape in a general direction parallel to said line of opening but following an oblique plane with reference to the plane of said tape when it is located outside said mobile chamber and in a position displaced to one side with respect to a plane normal to this latter at the level of the line of opening, two further said conical rollers and a further said cylindrical roller symmetrically disposed with respect to said first-mentioned three rollers, said latter conical rollers and cylinder roller permitting a second extremity of said tape passing out of said mobile chamber to be applied against the opposite side of the line of opening with respect to the center of said mobile chamber so as again to close in a fluid-tight manner the line of opening of the other side of the passage uncovered for the welding.

6. The sealing device of claim 5, further characterized by said mobile vacuum chamber being a bell which is fitted to be displaced along a curvilinear welding joint between two cylindrical barrel plates to be welded.

* * * * *